Aug. 19, 1958 B. G. ELLIOTT 2,848,103

GATHERING UNIT FOR HARVESTERS

Filed Nov. 25, 1955 3 Sheets-Sheet 1

INVENTOR.
BRANTFORD G. ELLIOTT
BY James E. Nilles
& Irwin L. Groh
ATTORNEYS.

Aug. 19, 1958 B. G. ELLIOTT 2,848,103

GATHERING UNIT FOR HARVESTERS

Filed Nov. 25, 1955 3 Sheets-Sheet 2

INVENTOR.

BRANTFORD G. ELLIOTT

BY James E. Nilles

& Irvin L. Groh

ATTORNEYS.

Aug. 19, 1958 B. G. ELLIOTT 2,848,103

GATHERING UNIT FOR HARVESTERS

Filed Nov. 25, 1955 3 Sheets-Sheet 3

INVENTOR.
BRANTFORD G. ELLIOTT
BY James E. Nilles
& Irvin L. Groh
ATTORNEYS.

United States Patent Office 2,848,103

Patented Aug. 19, 1958

2,848,103

GATHERING UNIT FOR HARVESTERS

Brantford G. Elliott, Royal Oak, Mich., assignor to Massey-Ferguson Inc., Baltimore, Md., a corporation of Maryland Application November 25, 1955, Serial No. 549,023

7 Claims. (Cl. 198—213)

This invention relates to a row crop forage harvester and more particularly to a gathering unit for conveying severed stalks to the chopping means of the harvester.

Corn forage harvesters where this invention finds particular utility are used for severing standing rows of drilled corn and for chopping the severed stalks of corn into short lengths. Such forage harvesters comprise a base unit having a chopping mechanism and a gathering unit for cutting the crop from the ground and conveying it to the chopping mechanism of the base unit. The gathering units of corn harvesters utilize conveying means incorporating moving parts disposed at opposite sides of the corn row for guiding and transporting the severed crop to the base unit. Despite the usual great number of moving and crop-engaging elements which are used, some of the severed crop escapes the action of the conveying means and either becomes entangled in the various moving elements and plugs the machine or falls to the ground where it is a loss to the harvesting operation. Furthermore, the large number of moving parts usually incorporated in the conveying means not only requires a great amount of power to bring about the necessary movement but also increases the cost of manufacture, maintenance and operation. In addition, the large number of moving parts and their supporting structure results in a relatively heavy gathering unit which is particularly undesirable in certain machines. For example, in some forage harvesters the row crop gathering unit used for the harvest of corn may be interchanged with other attachments, such as those used for picking up hay in windows. A heavy or bulky gathering unit increases the difficulty of attachment and detachment, and also of supporting and adjusting the attached gathering unit relative to the base unit.

It is a general object of this invention to provide an improved gathering unit for forage harvesters which reduces the crop loss to a minimum and gathers and conveys the crop in an efficient manner without plugging the machine.

It is a further object of this invention to provide a gathering unit for forage harvesters which utilizes a minimum number of moving parts thereby reducing the power requirements and the cost of manufacture and maintenance.

It is another object of this invention to provide a relatively light and compact gathering unit which facilitates attachment to and detachment from the base unit of a forage harvester.

Another object of the invention is to provide a gathering unit for harvesters having conveying screws at one side of the crop row which cooperate with a wall at the opposite side of the row to convey the crop to the chopping means of the harvester.

Another more specific object of the invention is to provide a gathering unit for harvesters which utilizes conveying screws having a substantial portion of the screw blades shielded so that only a portion of the screw is contacted by the crop material.

The foregoing and other objects and advantages are attained by the present invention, various novel features of which will be apparent from the following description and from the accompanying drawings disclosing a preferred embodiment of the invention.

Referring to the drawings.

Figure 1:
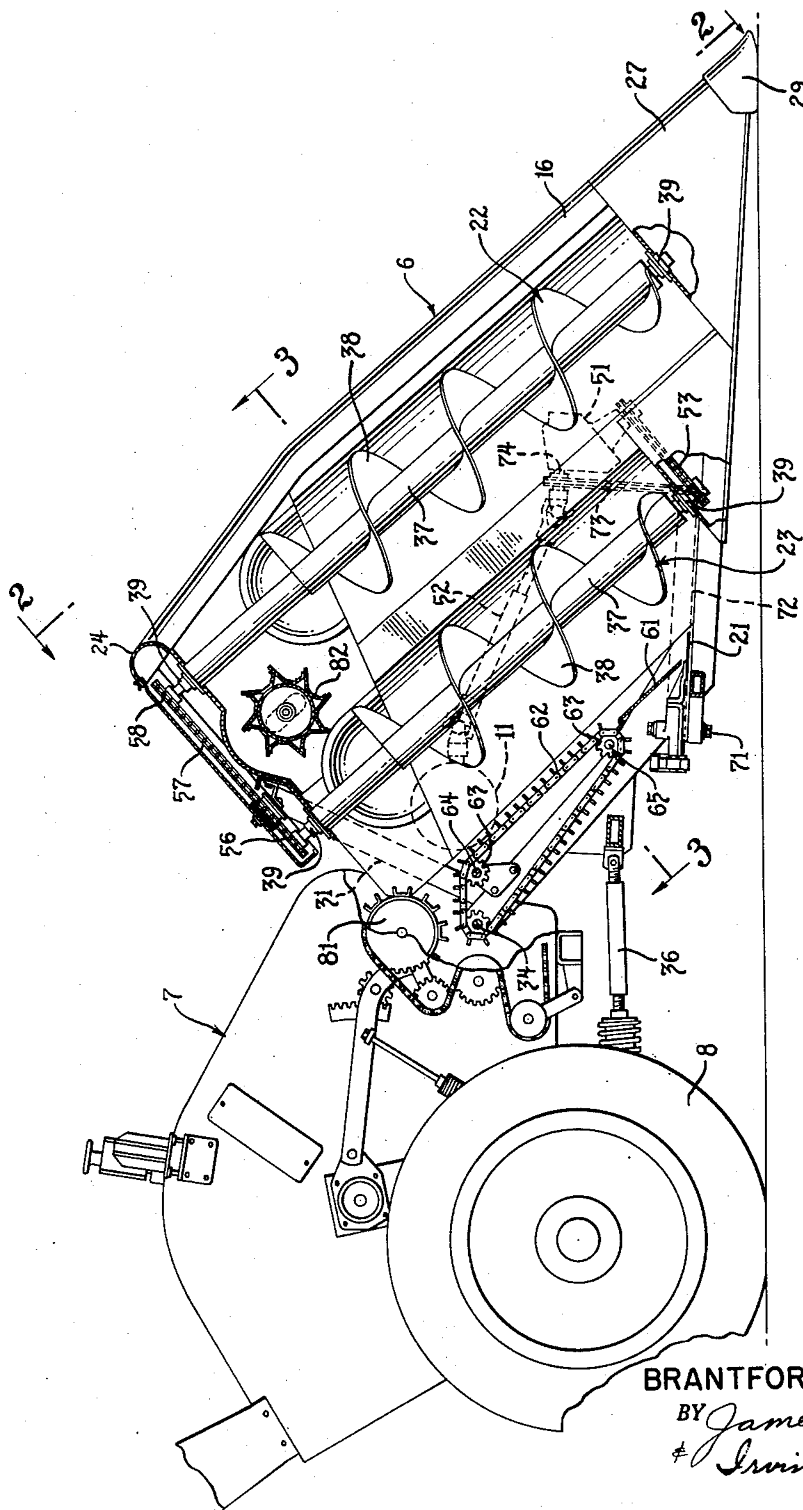
Fig. 1 is a side view of a gathering unit attached to the base unit of a forage harvester, the parts being broken away and shown in section for the purposes of disclosure.

Referring to Fig. 1 the harvester embodying the invention includes a row crop gathering unit 6 mounted on a base unit 7. The base unit includes the usual feed rolls and cutting head (not shown) and may be of a type pulled behind or mounted on a tractor. In the illustrated embodiment of the invention the base unit is adapted for mounting on a tractor (not shown) so that the unit is supported at one side by the tractor and at the other side by a ground-engaging wheel 8.

Figure 2:
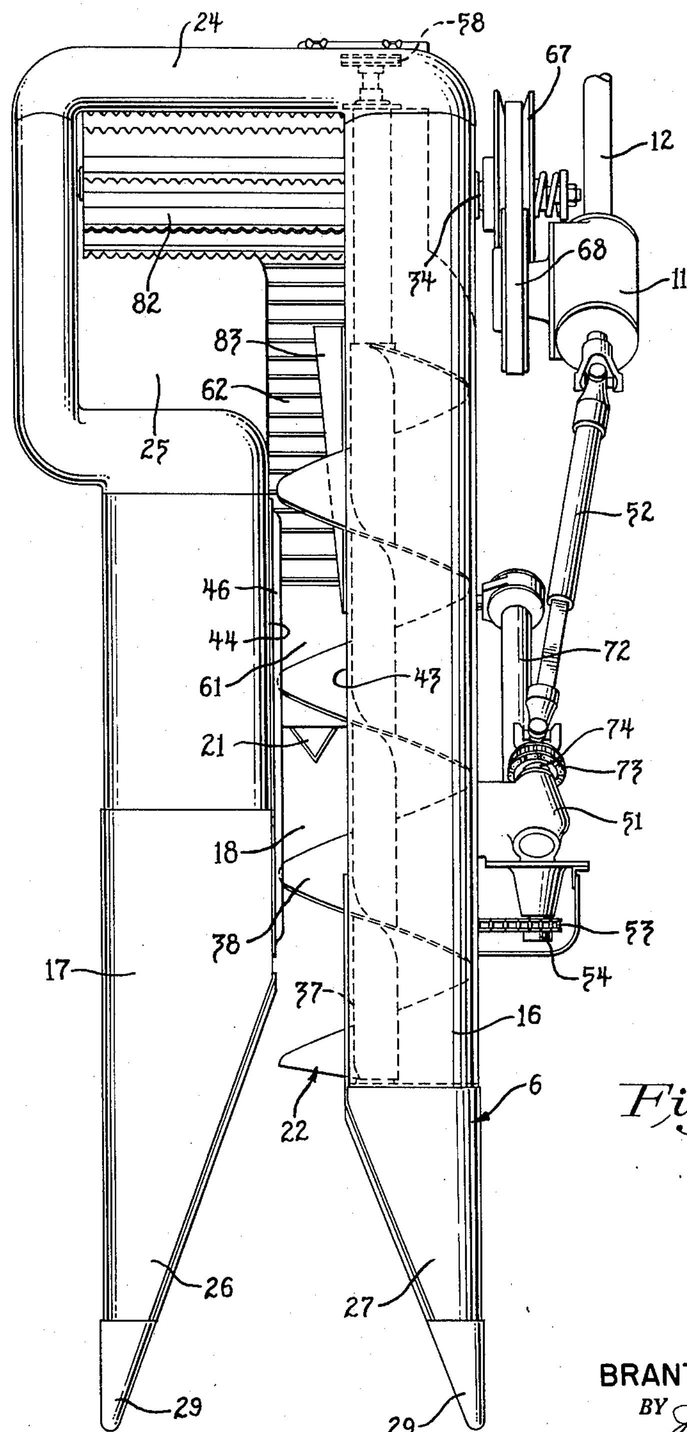
Fig. 2 is a view of the gathering unit taken on line 2—2, Fig. 1, but at an enlarged scale.

The usual cutting head or cylinder, and the feed rolls of the base unit 7, are driven in any conventional manner through gears and pulleys receiving their power from a transmission 11 which, as shown in Fig. 2, is mounted at one side of the gathering unit 6 and drivingly connected by means of a shaft 12 to an auxiliary engine or the usual power take-off shaft on a tractor.

The gathering unit or header 6 comprises a pair of longitudinally extending guide frames 16 and 17 laterally spaced from each other to form opposite sides of a crop gathering and conveying passage 18, a knife 21 for severing crop stalks received in the passage, and conveying means in the form of screws or augers 22 and 23 for engaging vertically spaced portions of the stalks and moving the stalks upwardly and rearwardly in the passage 18 for delivery to the cutting means of the base unit.

The guide frames 16 and 17 are formed of sheet metal and are laterally spaced apart to pass at opposite sides of a crop row. The frames are joined together at their rearward ends by a sheet metal structure 24 which, as seen in Fig. 2, forms a throat 25 having a relatively larger width than the passage 18, so that the crop material conveyed to the throat may be delivered to take advantage of the entire length of the chopping cylinder in the base unit. The guide frames 16 and 17 slope downwardly and forwardly to a point near the ground and their forward ends are provided with sheet metal nose members 26 and 27, which have oppositely facing walls diverging forwardly to form a passage entrance somewhat wider than passage 18. The forward ends of the nose members are provided with shoes 29 which protect the sheet metal portions and absorb any wearing action which might occur when the forward portion of the header engages the ground. The entire sheet metal structure forming the guide frames 16 and 17, the throat 25 and nose members 26 and 27 is mounted on a suitable frame 31 to form a unitary structure adapted to be detachably mounted on base unit 7.

The means for mounting the crop gathering unit 6 on the base unit 7, comprises a pair of bearing boxes 32 and 33 (Fig. 3) which are mounted at opposite sides of the frame structure 31. The bearing boxes not only journal a transverse shaft 34 for a purpose to be described later but also form transversely aligned trunnions which may be detachably received by brackets (not shown) on the base unit 7 to permit limited pivotal movement of the gathering unit or header 6 relative to the base unit 7. The forward end of the header unit may be adjusted vertically to dispose the shoes 29 at the desired height above the ground and may be retained in a selected position by means including a jack arrangement 36 which, as shown in Fig. 1, is interposed between the base unit 7 and header 6.

The conveying screws 22 and 23 are of equal diameter and each includes a shaft 37 and continuous helical blade 38 whose radial dimension is considerably greater than the radius of the shaft 37. The opposite ends of the shafts 37 are journalled in bearings 39 supported on the guide frame 16 so that the shafts are disposed in parallel spaced relation to each other and extend rearwardly and upwardly in the same vertical plane parallel to a vertical wall 44 formed by the other guide frame 17. The screw blades 38 extend across the passage 18 so that the edge portion of the blades are disposed in closely adjacent relation to the vertical wall 44, the spacing being less than the diameter of an average stalk of corn.

Figure 3:
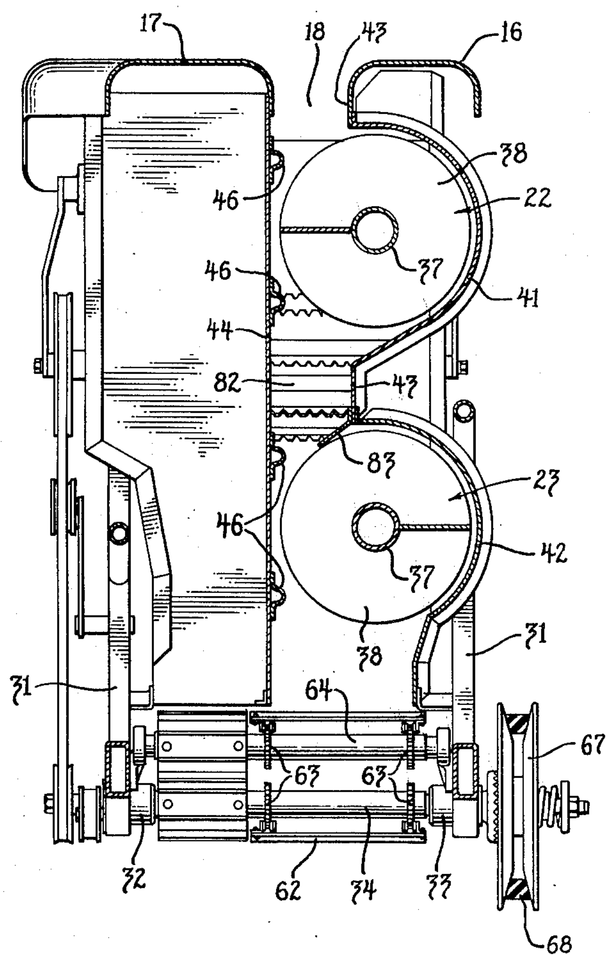
Fig. 3 is an enlarged sectional view taken on line 3—3, Fig. 1.

As best seen in Fig. 3, the screws 22 and 23 are shielded by elongated, semi-cylindrical housings or troughs 41 and 42 formed in the sheet metal structure which makes up the guide frame 16. The troughs are spaced apart by a portion of a vertical wall 43 at one side of passage 18 and their open sides face the vertical wall 44 disposed at the opposite side of the passage 18 in tangential relation to the screws 22 and 23. The screws are disposed in the troughs with the edges of their blades close to the wall portions of the troughs. It will be apparent from Fig. 2 that with this arrangement a substantial portion of each screw blade is shielded by the walls of the troughs and the remaining portion of each of the screw blades is disposed in the passage 18 between the vertical walls 43 and 44. As the screws are rotated about their axes in the troughs 41 and 42, crop stalks in the passage 18 come in contact with and are conveyed by portions of the screw blades 38 within the passage 18. If the stalks are raised above the screw shafts 37 the vertical wall 43 prevents the ends of the stalk from passing to the right of the shafts 37 as viewed in Fig. 3. This avoids wrapping of the stalks about the screw shafts and consequent plugging of the machine. In the case of corn, the wall portions 43 also have a tendency to keep the ears on the stalks within the passage 18 and to prevent them from passing over the shafts 37 where they would be twisted from the stalks. Furthermore, if the ears are separated from the stalks by the action of the screws, they will become trapped within the passage 18 or in the troughs by the combined action of the screws and the mass of moving corn stalks and will be conveyed to the throat 25 for delivery to the chopping cylinder. In this manner the coaction of the troughs 41, 42, the screws 22, 23 and the vertical walls 43, 44 of the passage 18 prevents crop loss and wrapping of stalks about the screw shafts which reduces the efficiency of the screws and interrupts operation of the harvester.

The vertical wall 44 formed by frame 17 is reinforced by a plurality of ribs 46 rigidly connected to the wall and extending in generally parallel relation to the screw shafts 37. One pair of ribs 46 is associated with each screw, with one rib disposed at each side of the associated screw to extend into passage 18. As seen in Fig. 3, the relative positions of the screw blades 38 and ribs 46 is such that a vertical stalk in passage 18 is kept in the path of the screw blades and cannot escape the action of the conveying screws 22 and 23.

Referring to Figs. 1 and 2, driving power for simultaneously rotating the screws 22 and 23 is delivered from the transmission 11 to an auxiliary transmission 51 by means of a shaft 52. The drive means between the auxiliary transmission and the screws 22, 23 is afforded by a sprocket and chain drive arrangement 53 between the output shaft 54 and the lower screw 23. The rearward end of the lower screw shaft is provided with a sprocket 56 rotatably connected by a chain 57 to a relatively larger sprocket 58 on the shaft of the upper screw 22. Rotation of the lower screw 23 will therefore rotate the upper screw 22 in the same direction but at a somewhat slower speed.

The lower rear portion of passage 18 is provided with a bottom formed by a plate 61 disposed between the guide frames 16 and 17 and extending upwardly and rearwardly to a point adjacent an endless conveyor 62. The conveyor is supported to move on pairs of sprockets 63 mounted on shafts 64 and 65, and also on transverse shaft 34 journaled in bearing boxes 32 and 33. The shafts are mounted on the crop gathering unit 6 in parallel relation to each other and in transverse relation to the direction of travel. Rotational power is supplied to the conveyor 62 through a pulley 67 on the shaft 34 connected by a belt 68 to the transmission 11. The portion of the conveyor between the shafts 64 and 65 is disposed at the same rearwardly and upwardly extending angle as the bottom plate 61 and acts with the latter to form a bottom portion in the passage 18.

The knife 21 for severing stalks of corn, which enter the passage 18, is disposed adjacent the forward end of the bottom plate 61 and is mounted for pivotal movement about a vertical shaft 71. The knife is reciprocated about shaft 71 by a driving means including a crank shaft 72 connected through a chain and gear drive arrangement 73 to the input shaft 74 of the auxiliary transmission 51.

In operation in a corn field, the harvester is moved to the right, as viewed in Fig. 1, so that the nose portions 26 and 27 pass at opposite sides of the corn row. The nose portions tend to raise fallen or broken stalks and to guide them together with the standing stalks toward the passage 18 until they are engaged near the ground by the blade 38 of the upper screw 22. Due to movement of the harvester and the rotation of the upper screw, the stalks will move rearwardly in passage 18 and because of the angular disposition of the screws, each stalk will be engaged at a progressively greater height. Thereafter the lower portions of the stalks are engaged by the blade 38 of the lower screw 23. The lower screw turns more slowly than the upper screw so that the stalks are bent forwardly a slight amount at the time they are severed from the ground by the reciprocating knife 21. The severed stalks are then conveyed upwardly and rearwardly between the walls 43 and 44 by the screw blades 38 with the severed ends of the stalks passing against the bottom plate 61 until they come into contact with conveyor 62. Further movement of the corn stalks in the passage is aided by counterclockwise movement of the conveyor 62 as viewed in Fig. 1.

Because of the difference in rotational speeds of screws 22 and 23, each stalk is tilted forwardly and the amount of tilting increases as the stalks approach the rearward end of passage 18, so that both screws disengage from the stalk at approximately the same time. Further conveying movements of the stalk to the chopping cylinder associated with the base unit 7 is brought about by the portion of the conveyor disposed between the shafts 34 and 64, and also by the clockwise rotation of the feed rolls 81 and 82 mounted in transverse relation on the base unit 7 and header 6, respectively.

As seen in Figs. 2 and 3, a tapered deflector plate 83 is disposed in passage 18 and rigidly attached to guide frame 16 at a point on the vertical wall 43 between the troughs 41 and 42. The deflector plate tends to urge the corn stalks towards the wall portion 44 and is particularly advantageous when the corn to be harvested includes short stalks which, after being severed, would not be engaged by the upper screw 22. The deflector plate is disposed above the lower screw 23 so that movement of the upper portion of a short stalk of corn is resisted during conveying movement of the lower screw 23. Short stalks of corn will therefore be conveyed upwardly and rearwardly at an angle by the action of the lower auger 23 and plate 83, and then by the lower auger and conveyor 62 for delivery to the chopping means associated with the base unit 7.

It will be noted that there has been provided a crop gathering unit for harvesters which utilizes a pair of conveying screws disposed at one side of a crop row to cooperate with a wall at the other side of the row so that severed crop is tilted forwardly and conveyed upwardly and rearwardly to the chopping means of the harvester. Also it will be apparent that at any instant of time only a portion of the conveying screw blades are in contact with the crop, and that the remaining portions of the screws are shielded to avoid wrapping of the crop about the screws and to prevent crop from escaping the conveying action of the screws and becoming a loss to the harvesting operation.

I claim as my invention:

1. A gathering unit for a harvester comprising, a pair of laterally spaced longitudinally extending guide frames defining a crop conveying passage therebetween, said frames each presenting a vertical wall portion in said passage, one of said wall portions presenting a pair of vertically spaced elongated troughs facing said other wall portion, a pair of conveying screws mounted on one of said guide frames to rotate about axes in said pair of troughs, respectively, said screws each presenting a blade portion disposed in said passage in proximity to said other wall, and means for rotating said screws whereby the crop disposed between said vertical wall portions is engaged at vertically spaced points by said blade portions and is conveyed rearwardly in said passage.

2. A gathering unit for a harvester comprising, a pair of laterally spaced longitudinally extending guide frames defining a crop conveying passage therebetween, said frames each presenting a vertical wall in said passage, a pair of conveying screws each presenting a shaft and a helical blade, said screws being mounted on one of said guide frames with said shafts disposed in generally parallel relation to each other and extending upwardly and rearwardly to one side of both of said walls, one of said vertical walls presenting a pair of semi-cylindrical troughs opening into said passage and surrounding a substantial part of each of said screw blades, the remaining parts of said screw blades being disposed between said vertical walls, and means for rotating said screws whereby upper and lower portions of the crop are engaged by the part of said screw blades disposed between said vertical walls and the crop conveyed rearwardly and upwardly in said passage.

3. A gathering unit for a harvester comprising, a pair of laterally spaced longitudinally extending guide frames defining a crop conveying passage therebetween, one of said frames presenting a vertical wall in said passage, a pair of vertically spaced conveying screws rotatably mounted on the other of said frames to one side of said passage, said screws each presenting a blade portion disposed in said passage in closely adjacent relation to an associated portion of said vertical wall, a pair of longitudinally extending rib members associated with each of said screws and rigidly connected to said vertical wall at opposite sides of said associated wall portions, and drive means for rotating said screws whereby crop disposed between said pairs of rib members and the other of said frames is engaged by said blade portions and conveyed rearwardly in said passage.

4. A gathering unit for a harvester comprising, a pair of laterally spaced longitudinally extending guide frames defining a crop conveying passage therebetween, one of said frames presenting a vertical wall in said passage, the other of said frames presenting a pair of vertically spaced elongated troughs facing said wall, a pair of parallel spaced rib members associated with each of said troughs and rigidly mounted on said wall in opposed relation to said troughs, a pair of conveying screws mounted for rotation about axes disposed in said troughs, respectively, said screws each presenting a blade portion extending into said passage and disposed in proximity to a portion of said wall between the associated pair of rib members, and drive means for rotating said screws whereby the crop disposed between said rib members and said troughs is engaged by said blade portions and conveyed rearwardly in said passage.

5. A stalk gathering unit for a harvester comprising, a pair of laterally spaced longitudinally extending guide frames defining a stalk conveying passage, one of said frames presenting a vertical wall portion in said passage, a pair of conveying screws mounted on the other of said frames for rotation about axes extending rearwardly and upwardly in a vertical plane parallel to said wall portion and to one side of said passage, each of said screws presenting a continuous helical blade having edge portions spaced a distance less than the diameter of a stalk from said wall portion, and drive means for rotating said screws at different rates of speed whereby a stalk disposed between said wall and said screws is conveyed upwardly and rearwardly at an angle in said passage.

6. A stalk gathering unit for a harvester comprising, a pair of laterally spaced longitudinally extending guide frames defining a stalk conveying passage having parallel vertical walls, one of said walls presenting a pair of vertically spaced elongated troughs facing said other wall and extending rearwardly and upwardly, a pair of parallel spaced rib members associated with each of said troughs and rigidly mounted on the other of said walls in opposed relation to said troughs, a pair of conveying screws mounted on one of said guide frames to rotate about parallel axes disposed in said troughs, respectively, said screws each presenting a blade portion disposed in said passage and spaced a distance less than the diameter of a stalk from portions of said other wall disposed between the associated pair of rib members, and drive means for rotating said screws at different rates of speed whereby a stalk disposed between said ribs and said one wall is engaged at vertically spaced points by said blade portions and is tilted forwardly and conveyed upwardly and rearwardly in said passage.

7. A stalk gathering unit for a harvester, comprising a pair of laterally spaced longitudinally extending guide frames defining a stalk conveying passage therebetween, a pair of vertically spaced conveying screws mounted on one of said frames for rotation about parallel axes extending rearwardly and upwardly in a vertical plane spaced to one side of said passage, each of said screws presenting a continuous helical blade having portions disposed in said passage, the other of said frames presenting a vertical wall portion disposed in spaced tangential relation to both of said screws at a distance less than the diameter of a stalk, and drive means for simultaneously rotating both of said screws to engage stalks in said passage and convey them upwardly and rearwardly.

References Cited in the file of this patent

UNITED STATES PATENTS

| | | |
|---|---|---|
| 1,665,404 | Crabill | Apr. 10, 1928 |
| 2,571,865 | Greedy et al. | Oct. 16, 1951 |

UNITED STATES PATENT OFFICE

CERTIFICATE OF CORRECTION

Patent No. 2,848,103 — August 19, 1958

Brantford G. Elliott

It is hereby certified that error appears in the printed specification of the above numbered patent requiring correction and that the said Letters Patent should read as corrected below.

Column 5, line 58, for "wall portions" read -- screws --; column 6, line 29, for "parallel" read -- spaced --.

Signed and sealed this 19th day of January 1960.

(SEAL)

Attest:

KARL H. AXLINE

Attesting Officer

ROBERT C. WATSON

Commissioner of Patents